M. D. HAMRICK.
DRAFT HOOK.
APPLICATION FILED MAY 3, 1919.
1,347,369.                                      Patented July 20, 1920.
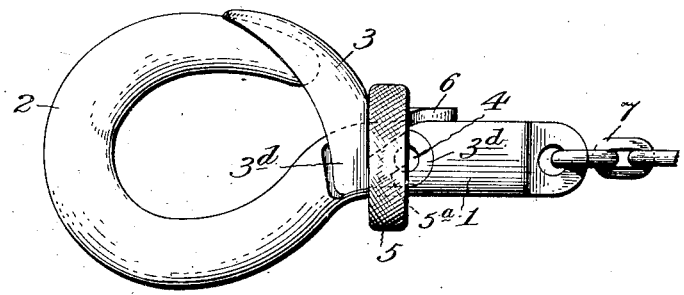
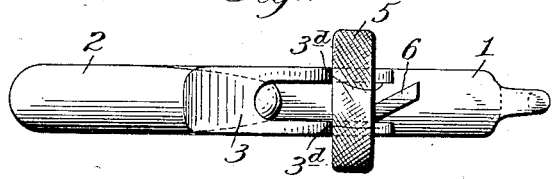
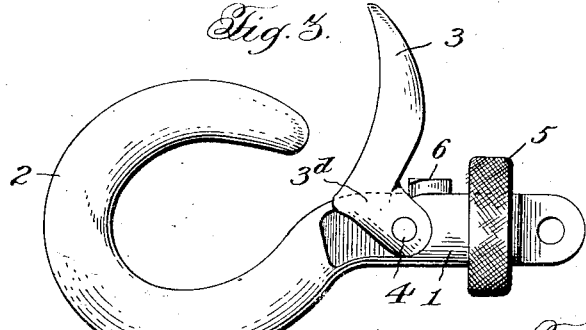
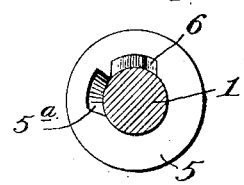
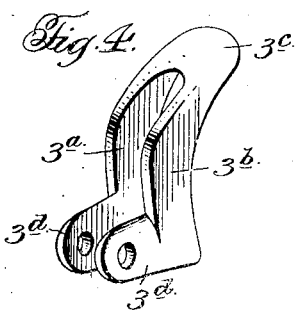
Witness:
Jas E Hutchinson
Inventor:
Martin D. Hamrick,
By Meyers Cushman & Rea
Attorney

UNITED STATES PATENT OFFICE.

MARTIN D. HAMRICK, OF CHEHALIS, WASHINGTON, ASSIGNOR OF ONE-HALF TO ANDREW E. YOUNG, OF CHEHALIS, WASHINGTON.

DRAFT-HOOK.

1,347,369.                    Specification of Letters Patent.        Patented July 20, 1920.

Application filed May 3, 1919. Serial No. 294,608.

*To all whom it may concern:*

Be it known that I, MARTIN D. HAMRICK, a citizen of the United States, residing at Chehalis, in the county of Lewis and State of Washington, have invented new and useful Improvements in Draft-Hooks, of which the following is a specification.

The present invention relates to improvements in draft hooks, and the object of the invention is to provide such a hook, specifically adapted for use in logging operations, which will possess advantages over the forms of hook heretofore commonly employed.

In the accompanying drawings;

Figure 1 is an elevation of a hook constructed in accordance with the present invention, showing the guard thereof in closed position.

Fig. 2 is an edge view.

Fig. 3 is an elevation of the hook with the guard open.

Fig. 4 is a detail perspective of the guard.

Fig. 5 is a sectional view through the stem or shank of the hook.

Referring to the drawings, it will be seen that the hook comprises a stem or shank 1, a bill portion 2, and a guard member 3 which is pivotally connected to the stem or shank and adapted to be turned to and from a position where it will close the opening between the stem and bill.

Preferably the guard is of the form shown specifically in the detail Fig. 4 including two sides or members $3^a$, $3^b$, which are connected at one end by an integral web $3^c$, and are provided at their other ends with ears $3^d$, which are adapted to straddle the shank or stem 1 and are pivotally connected therewith as by a pin 4. The connected end $3^e$ of the guard is of such form as to receive the tip end of the bill when turned into operative position as shown in Figs. 1 and 2 in which it will be seen that the free end of said guard extends but very slightly beyond the surface of the body of the bill. The two ears $3^d$ at the bifurcated end of the guard closely embrace the shank or stem 1 and the locking means hereinafter referred to is adapted to surround said ears as well as the stem when in operative position.

A locking ring 5 surrounds the shank or stem 1, and is adapted to be moved longitudinally thereof to rock the guard 3 about its pivotal connection into the position shown in Figs. 1 and 2, and when in this position said ring abuts the outer surface of said guard, and an abutment 6 on the stem 1 so that the guard is retained in such closed position and not liable to be accidentally displaced, as a positive movement of the locking ring is necessary in order to enable it to be moved away from the guard past the abutment 6.

As shown, the abutment is in the form of a short rib or lug projecting from the shank or stem and extending generally in the direction of the length thereof, the ring being provided with a channel or groove $5^a$ adapted to receive said lug as it is moved longitudinally of the stem. Preferably the lug 6 is inclined relative to the length of the stem 1 so that in moving the locking ring thereover, the latter will be given a slight turning movement which will cause the groove 7 to be out of alinement with the lug 6 when the ring is positioned to force the guard 3 against the bill 2, as shown in Figs. 1 and 2. In this position, the ring forms a solid lock between the guard and end of the lug 6 and can only be moved from such position by first turning the same slightly and then moving it longitudinally of the stem during which a further rotary movement will be imparted to it.

As shown the hook is connected to one end of a chain 7, and this, for the purposes for which the hook is particularly designed is connected with a suitable winding drum or other means by which longitudinal draft is exerted upon the hook. As before stated, the hook is particularly designed for use in logging operations, being intended to engage with a chain or cable passed about a log or logs for the purpose of connecting them to a means by which they can be moved over the ground. With the open hooks commonly employed for this purpose, there is considerable trouble and annoyance due to the fact that whenever the tension on the draft chain is relaxed, the hook is liable to become disengaged from the chain or cable about the logs and thus require frequent readjustment and constant attention on the part of the workmen.

By the present invention, it will be seen that when the parts are in the position shown in Figs. 1 and 2, the hook is completely closed and yet the locking ring 5 may be quickly adjusted to permit the guard to be swung into the inoperative, open, position shown in Fig. 3 when the hook can be easily disengaged from the chain or cable engaged thereby. The guard is of such form, and so related to the curved bill of the hook when in operative position, that it is not liable to catch on obstructions over which the logs may be moved, and the ring 5 in coöperation with the end of the lug 6 positively holds the guard in its closed position.

Having thus described the invention, what is claimed is:

1. A draft hook comprising a shank, a curved bill integral with the shank, a guard pivotally connected to the shank to swing to and from a position across the space between the shank and free end of the bill, an abutment on the shank, and a ring embracing the shank and movable longitudinally thereof to force the guard into closed position, said ring being rotated during such movement to a position where it will coöperate with the abutment to retain the guard in such position.

2. A draft hook comprising a shank, a curved bill integral with the shank, a guard pivotally connected to the shank to swing to and from position across the space between the shank and free end of the bill, an abutment on the shank, and a ring embracing the shank and movable longitudinally thereof over the abutment to turn the guard about its pivot against the bill, the movement of said ring over the abutment acting to turn the ring so that it will constitute a rigid lock between the abutment and guard when the latter is in closed position.

3. A draft hook comprising a shank or stem, a curved bill integral with the shank, a guard pivotally connected to the shank to swing to and from a position across the space between the shank and free end of the bill, an abutment on the shank, and a ring having a sliding and rotary engagement with the shank and adapted to coöperate with the abutment to lock the guard against movement away from the bill.

4. A draft hook comprising a shank or stem, a curved bill, a guard pivotally connected at one end to the shank or stem and movable to and from a position where it will close the opening between the shank and bill, a projection on the shank adjacent the pivotal point of the guard, a locking ring surrounding the shank and movable to and from engagement with the guard past said projection, the ring having an interior groove to receive said projection and being adapted to be turned about the shank, when it is between the projection and guard, to constitute a lock for holding the guard in closed position.

5. A draft hook comprising a shank or stem, a curved bill, a guard including two members connected at one end by a portion curved to receive the free end of the bill and conform closely to the curvature thereof and having their other ends terminating in ears that extend longitudinally of and are pivotally connected to the shank, a projection on the shank adjacent the connection of the guard therewith, and a ring mounted on the shank and movable past said projection and being automatically turned during such movement to constitute with the projection a lock for holding the guard in closed position.

In testimony whereof I have hereunto set my hand.

MARTIN D. HAMRICK.